United States Patent [19]

Gearing et al.

[11] 3,898,628

[45] Aug. 5, 1975

[54] CONTROL ARRANGEMENT FOR COMMUNICATION SWITCHING SYSTEM INPUT/OUTPUT RECORDING APPARATUS

[75] Inventors: Bryan F. Gearing, Bedford, Mass.; Martin R. Winandy, La Grange, Ill.

[73] Assignee: GTE Automatic Electric Laboratories Incorporated, Northlake, Ill.

[22] Filed: Jan. 18, 1974

[21] Appl. No.: 434,745

[52] U.S. Cl. ...... 340/172.5; 179/7 MM; 179/18 EB

[51] Int. Cl. ...... G06f 1/00

[58] Field of Search ...... 179/7 MM, 8 R, 18 EB, 18 ES; 340/172.5

[56] References Cited

UNITED STATES PATENTS

| | | | |
|---|---|---|---|
| 3,576,433 | 4/1971 | Biewer | 340/172.5 |
| 3,737,873 | 6/1973 | Puccini | 179/18 EB |
| 3,813,495 | 5/1974 | Jeffery | 179/7 MM |

*Primary Examiner*—Ralph D. Blakeslee

[57] ABSTRACT

A control arrangement for communication switching system input/output recording apparatus includes an input register for receiving a series of words to be stored by the recording apparatus, such as a magnetic tape unit, a byte allotter for transferring sequentially portions of the word to be stored to an output register for supplying to the recording apparatus, circuits for generating fill information portions and for transferring them sequentially along with the word portions to the output register, and logic circuits responsive to the system central processor interrupting its supply of information words to the input register for inhibiting the fill information to cause the output register to supply null information indicative of the interrupt.

6 Claims, 2 Drawing Figures

TICKETING MAGNETIC TAPE UNIT

CONTROL ARRANGEMENT FOR COMMUNICATION SWITCHING SYSTEM INPUT/OUTPUT RECORDING APPARATUS

BACKGROUND OF THE INVENTION

1. Field of the Invention

The present invention relates to a control arrangement for a communication switching system input/output recording apparatus, such as a magnetic tape unit.

2. Description of the Prior Art

Communication switching systems, such as electronic telephone systems, have employed input/output recording apparatus, such as magnetic tape to store system information. In the case of a telephone system, the information recorded on tape could include toll ticketing information used for billing purposes. The information is transferred from a system control processor in the form of a long series of information words which are written onto the tape as it moves continuously past the write heads after the tape is brought up to the desired speed. If the central processor is unable to supply continuously the recording equipment with the words to be recorded thereon as a result, for example, of a system interrupt condition occurring, no data is then available for writing on the tape. Such a situation is highly undesirable and is to be avoided since in the case of recording ticketing information, subscriber may be billed erroneously. On a continuously moving tape transport unit, as opposed to an incremented unit such as a perforated tape unit, the tape is read immediately following the writing of information thereon for checking purposes, and should blank spaces be detected, they are erroneously interpreted as an end of a data block. Therefore, the data must be supplied continuously by the processor without interruption, since the tape does not stop. As a result, it would be highly desirable to have an arrangement for handling unexpected delays in the feeding of a stream of data to a continuously moving magnetic tape for storage thereon.

SUMMARY OF THE INVENTION

The object of the present invention is to provide a new and improved communication switching system control arrangement for handling unexpected delays in the feeding of a stream of data to a continuously moving magnetic tape for storage thereon.

CROSS-REFERENCES TO RELATED APPLICATIONS AND PATENTS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 342,323, filed Mar. 19, 1973 now U.S. Pat. No. 3,835,260, issued Sept. 10, 1974, hereinafter referred to as the SYSTEM application. The system may also be referred to as No. 1 EAX or simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent. The register-sender subsystem is described in U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586 filed Aug. 17, 1972 now U.S. Pat. No. 3,806,659 issued Apr. 23, 1974 by J. W. Eddy for an INTERLOCK ARRANGEMENT FOR A COMMUNICATION SWITCHING SYSTEM, Ser. No. 311,606 filed Dec. 4, 1972 now U.S. Pat. No. 3,830,983 issued Aug. 20, 1974 by J. W. Eddy and S. E. Puccini for a COMMUNICATION SYSTEM CONTROL TRANSFER ARRANGEMENT, Ser. No. 303,157 filed Nov. 2, 1972 now U.S. Pat. No. 3,809,822 issued May 7, 1974 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973 now U.S. Pat. No. 3,814,859 issued June 4, 1974 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 4, 1973 now U.S. Pat. No. 3,831,151 issued Aug. 20, 1974 by L. V. Jones and P. A. Zelinski for a SENSE LINE PROCESSOR WITH PRIORITY INTERRUPT ARRANGEMENT FOR DATA PROCESSING SYSTEMS.

Programs for communication between the data processing unit and the register-sender, in addition to the SYSTEM application, are disclosed in U.S. patent application Ser. No. 358,753 filed May 9, 1973 now U.S. Pat. No. 3,819,865 issued June 24, 1974 by F. A. Weber et al.

The scanner for the local automatic message accounting subsystem is disclosed in patent application Ser. No. 434,743, filed Jan. 18, 1974 by B. F. Gearing, M. R. Winandy, G. Grzybowski and D. F. Gaon; and in two articles in the GTE Automatic Electric Technical Journal, Vol. 13, No. 4, (October, 1972) at pages 177–184 and pages 185–196.

The magnetic tape unit of the local automatic message accounting subsystem is disclosed in patent application Ser. No. 434,742, filed Jan. 18, 1974 by B. F. Gearing et al.

The above patents, patent applications, and articles ·e incorporated herein and made a part hereof as ıough fully set forth.

DESCRIPTION OF THE PREFERRED EMBODIMENT

Figure 1:
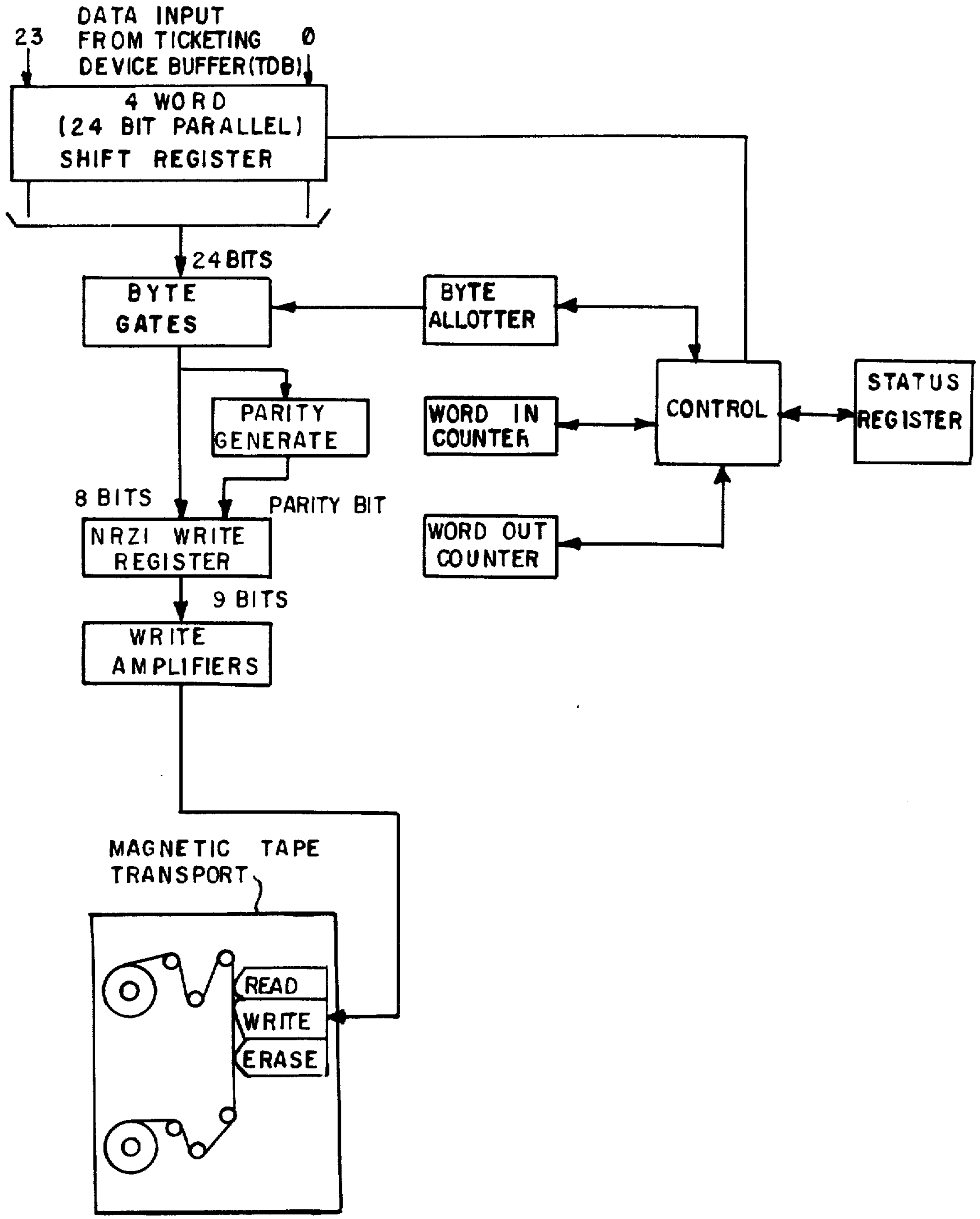
FIG. 1 is a block diagram of a ticketing magnetic tape nit of a local automatic message accounting system, ıcorporating the principles of the present invention; ıd

Referring now to FIG. 1 of the drawings, there is ıown a ticketing magnetic tape unit, which is adapted ɔ be used in a communication switching system (not nown) to provide a temporary record of individual toll all data for future processing and subscriber billing, nd which employs the reformatting arrangement of ne present invention. Provisions are also made for the ecording of data for non-billing purposes such as divi-ion of revenue and toll traffic studies.

The ticketing magnetic tape unit generally comprises he magnetic tape transport and its associated read/-/rite electronics, data buffering, error detection, and ape drive control electronics. The magnetic tape trans-ıort is controlled in the writing mode of operation by he write amplifiers located in the magnetic tape elec-ronics circuit. These amplifiers supply write current to he transport write heads. The nine bits are fed to the vrite amplifiers by the non-return to zero change at ɔne (NRZ1) write register. The magnetic tape is pro-:essed for subscriber billing at data processing centers ıtilizing IBM machines. To be compatible with those nachines, NRZ1 recording on magnetic tape is utilized with strict requirements on bits to track positioning. In NRZ1 recording, the intelligence on the tape is the change of flux, not necessarily the polarity of the flux. Initially, the tape is polarized in one direction; the erase head polarity determines the direction of flux. The NRZ1 register combines the eight data bits with a parity bit from the parity generator circuit. The eight data bits are also fed into the parity circuit so that even parity can be determined and recorded on the ninth bit. The byte gates restructure the computer words into tape bytes of either 3 or 6 bytes per computer word. The gating required to control the flow of data bits to the magnetic tape NRZ1 register allows eight data bits at a time to enter the NRZ1 register in the 3 byte write mode, or four data bits at a time with the remaining four data bits set to a byte fill character (1111), in the 6 byte write mode. The byte gates obtain the computer word from the four word shift register. This four word capability reduces the central processor real time that is required by the magnetic tape unit and provides more time for the system central processor to service other requests in the system.

The byte allotter is supplied with the 3 or 6 byte write mode of operation information from the control circuit and determines the order of the bits to be removed from the shift register by the byte gates. The allotter also signals the word out counter whenever a complete word has been transferred from the four word shift register to the byte gates for writing on magnetic tape. The control circuit provides general buffering, gating, clock and logic drive capability for the magnetic tape unit. The word out counter records each computer word as it is removed from the four word shift register. After three words have been removed the word out counter informs the central processor through the ticketing device buffer (not shown) that the magnetic tape unit is ready to receive four more computer words to be written on tape. As these four words are received from the ticketing device buffer the word in counter notes each word as it is received. After three words have been received, the status register is informed to start the magnetic tape unit to write these words on magnetic tape. The fourth word remains in the ticketing device buffer until a complete computer word has been written on tape. The status register receives its directives from the central processor through the ticketing device buffer and then through the magnetic tape peripheral adapter instruction decode circuit (not shown).

Figure 2:
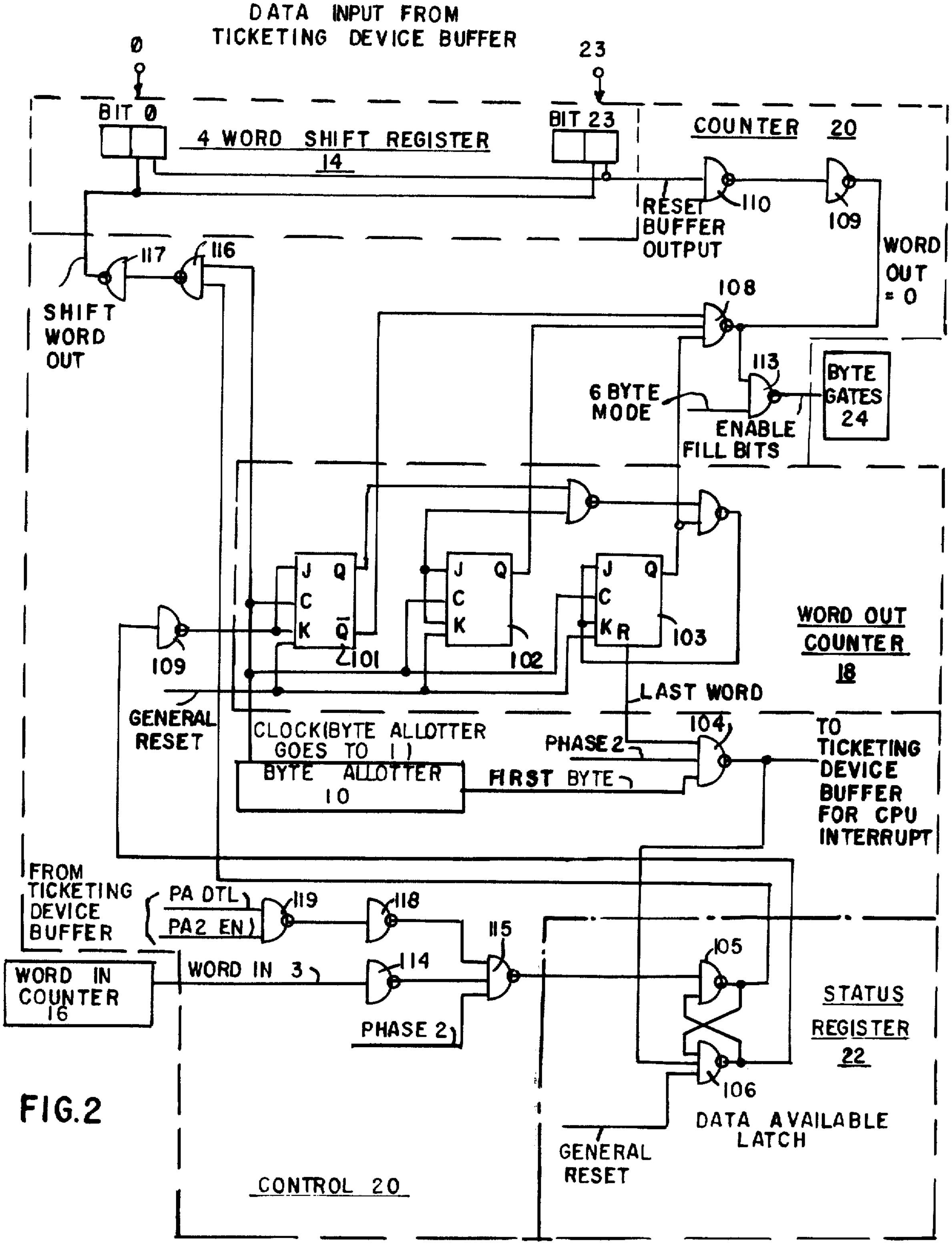
FIG. 2 is a symbolic block diagram of a portion of the ıagnetic tape unit of FIG. 1, showing the control arıngement of the present invention.

Referring now to FIG. 2, considering the reformatting arrangement of the present invention in greater detail, the word out counter 18 gates 101, 102, and 103 count the number of computer words from the shift register 14 that have been written on magnetic tape, until three words have been written and gate 104 is enabled to interrupt the central processor to request more data words to be written on tape and gate 104 also resets the status register 22 data available latch gates 105 and 106. If the processor does not return with more data before the fourth word of the shift register is written on tape through monitoring the word in counter for three words and gate 115 setting the data available latch through gate 105, the word out counter is reset from the status register data available latch through gate 107 and then on the next phase 2 clock pulse the four word shift register is reset from gates 108 through 112. Briefly, in operation the magnetic tape unit accepts four words by clocking them into its buffer and counting the number of words received. After the tape has reached operational speed (5 inches per second) the computer words are reformatted or restructured into magnetic tape characters and written on tape, while being counted by the word out counter. When there is only one word left to write, the controller circuit sends an interrupt to the central processor requesting more data, resets the data available latch and continues to write the last word out on tape. When the last character of the last word has been written on tape the control circuit checks the data available latch; if new data has been received the data available latch would have been set by the last word of the data transfer and the control circuit then outputs the new data on tape. If the data available latch is not set, the control circuit resets the output of the four word shift register and begins the cycle of writing a computer null word of 6 bytes on magnetic tape, and after this has been completed the control circuit again checks the data available latch and if the data has still not been received, one more computer word is again written on tape, and this continues until data is received or a time limit is exceeded. The null characters are readily identified by the remote data processing IBM facility and are ignored as not being meaningful data.

The OR gate 105 has its output connected to OR gate 106 and one of its inputs connected to the output of gate 106 to form a latch circuit and its output is also connected to gate 116 for controlling the shift word out clock pulses to the four word shift register 14 circuit, and the last input of gate 105 is connected to the output of AND gate 115, which controls the setting of this latch, labelled data available latch. The OR gate 106 has its output not only connected to the input of gate 105 but also to the input of N gate 107 for presetting the word out counter to start counting at a count of 0 and one of inputs to gate 106 is connected to a general reset signal enabled at the start of receiving computer words from the central processor, the other input being connected to the output of AND gate 104 for initiating an interrupt to the central processor to send more data and to indicate that the last computer word is being written on magnetic tape. The AND gate 104 has its output connected to OR gate 106 and generates an interrupt as previously mentioned and has one of its inputs connected to FF gate 103 for indicating that the last computer word is being written on tape, another input is connected to the phase 2 clock pulse signal for sequencing control, and the third input is connected to the byte allotter 10, which indicates when the first byte character is being written on magnetic tape. The N gate 109 has its output connected to AND gate 110 for controlling the reset of the output of the four word shift register and its input connected to the output of AND gate 108 for enabling the reset of the shift register output whenever the word out counter reaches a count of 0. The AND gate 110 has its output connected to the reset inputs of the 24 flip flops comprising the last word in the four word shift register 14 and one of its inputs connected to the output of N gate 109, the other input being connected to the phase 2 clock pulse signal. The AND gate 113 has its output connected to the byte gates 24 for enabling the byte fill bits to a null value (1111) when the ticketing magnetic tape unit is writing in the 6 byte mode of operation and one of its inputs is connected to the output of AND gate 108, the other input being connected to the 6 byte mode signal generated in the control circuit.

OPERATION

The program issues a select instruction to the ticketing magnetic tape unit, commanding it to set itself up for a 3 or 6 byte write mode of operation, and to accept four computer words. The magnetic tape peripheral adapter receives the write command from the central processor through the ticketing device buffer. The four words are accepted by clocking them into the four word shift register counting that four words have been received with the word in counter 16, and the magnetic tape transport drive is started. When the tape has reached writing speed the basic timing clock is enabled. The first phase 1 clock pulse steps the byte allotter 10 to a binary 1, which steps the word out counter to a 1 and shifts the first word into the output of the four word shift register while enabling the appropriate byte gates 24 to allow the first byte of the computer word in the shift register to enter the non-return to zero change at one (NRZ1) write register, which allows changes in flux to saturate the tape. On the phase 2 clock pulse the output of the NRZ1 write register is fed to the write amplifier and the character is written on tape. On the next phase 1 clock pulse the byte allotter 10 advances to a binary 2 count and the second byte is written on tape in a similar manner as previously disclosed. This process continues until the last byte of the first word is written on magnetic tape. The next phase 1 clock pulse steps the byte allotter 10 to a count of 1 again, which in turn steps the word out counter to a binary 2 and shifts the second word into the output register of the four word shift register. The second and third words are written on tape in the identical manner as previously disclosed for the first word in the shift register. When the first byte of the fourth word is written on tape, an interrupt is sent to the central processor to request more data and the data available latch, gates 105 and 106, is reset. The remainder of the fourth word is written on tape as previously described.

When the last byte of the fourth word has been written on tape and the data available latch is set, the process continues until all data of a block have been written on tape. The data available latch, gates 105 and 106, is set from the PA DTL lead from the ticketing device buffer. This lead indicates that a computer word is available to be read into the four word shift register 14. When three words have been counted into the peripheral adapter by the word in counter 16 and the ticketing device buffer indicates that it has received the fourth word, the PA DTL lead is enabled to set the data available latch.

When the last byte of the fourth computer word has been written on tape and the data available latch has not been set, then when the byte allotter 10 steps to a binary count of 1 the word out counter 18 steps to a count of 000 from gate 107 being enabled by the data available latch, gates 105 and 106. This count of 0 is decoded by gate 108 and enables gate 110 to reset the last word in the four word shift register 14 on the next phase 2 clock pulse. As the byte allotter 10 steps through its six counts, the resetting of the shift register last word causes null characters (P00000000) to be written on magnetic tape. When the magnetic tape unit is processing in the 6 byte mode of operation, normally a byte fill character (1111) is generated for the least significant four bits of the eight data bit character written on tape. This byte fill character is inhibited from enabling the byte gates 24 through gate 113 turning off, which is controlled by the 6 byte mode signal being turned off when the data available latch is not set. When the cycle of writing the first word has been completed, the byte allotter 10 steps back to a binary 1 again and the word out counter 18 remains at a count of 000 if the data available latch is not set. The process of writing null characters is continued, as previously disclosed, until more data is received or an overall time-out condition occurs. When data is received, the four computer words are written on magnetic tape as previously mentioned until the last four words of the data block have been written on tape. The magnetic tape unit then writes the check character, disengages the transport drive and switches the power off the transport.

Nine Track Recording

Nine track recording is done at 800 bytes per inch using a NRZ1 (Non Return to Zero — IBM) recording technique. The information interchange code used is the IBM EBCDIC (Extended Binary Coded Decimal Interchange Code) magnetic tape code.

A description of the nine track tape organization and the EBCDIC code structure is given in the application Ser. No. 434,742 of B. F. Gearing et al.

Coding

Referring to Table I, in column 1 there is shown the ATT internal codes used within the central processor to represent the ATT data characters.

Other columns indicate the magnetic tape codes used for nine track magnetic tape recording. The peripheral hardware of the unit CPU provides the required code conversion. The tape mark and null characters are generated by the peripheral hardware.

Although, in the normal recording of billing data, the peripheral hardware provides the required code conversion from the four bit Automatic Toll Ticketing ATT internal machine code to the nine bit tape code, it is also possible to directly generate the tape code in the unit CP and output the data to the tape without conversion. This provides for a more abundant selection of information characters in the recording of non-billing data such as maintenance or traffic metering data.

Numeric Characters

All numeric characters are the standard IBM interchange code characters for nine channel magnetic tape recording.

Alphabetic Characters

Alphabetic characters are not used for the recording of billing data. The tape code format allows the use of alpha characters in the recording of non-billing data records. The alpha characters used are the standard EBCDIC characters for nine track recording and are generated directly in the tape code format within the unit CP and outputted to the tape without conversion by the peripheral hardware.

Graphic Characters

Graphic characters are not used in the recording of billing data.

As in the case of alpha characters, the code format allows the use of graphic characters in the recording of non-billing data, if they are generated directly in the tape code format by the unit CP.

All of the standard graphic characters in the EBCDIC code structure are available for use in the recording of non-ATT data.

Blank Character

The blank character is generated by the central processor CPU. The blank character has two basic functions:

1. It is used to fill in fields in the standard format which are not applicable to the specific record. For example, called number identification, disconnect time, etc., are not applicable to a MRS Call Record and thus are filled in with blank characters.

2. It is used to fill out word lengths. The system used a 24 bit word which comprises six BCD characters. If an output word includes only five BDC characters the remaining character position is filled with a blank character.

Repeat Block Character

The tape transport circuitry provides read checking for both vertical and longitudinal parity as will be described hereinafter. If a parity error is detected in the read operation the tape is advanced a distance of 3.75 inches and the block re-recorded. The eighth byte position of each data block is the repeat block character. It indicates to the accounting center whether the data is an original recording or a repeat of the previous block.

The repeat block character can be the digit 0 or 1. A zero indicates that the block is an initial recording of the data. If the read after write error checking circuitry detects a parity error, or if any other error is detected, the block is rewritten with the repeat block character set to a 1.

Tape Mark

The function of the tape mark character in the ATT coding format is an "end of file" indicator. It is rerecorded following a trailer label. There is also a 3.75 inch gap, called the "end of file" or tape mark gap, between the last byte of the trailer label and the tape mark character. The combination of the label, tape mark gap and tape mark character indicates to the accounting center that no further records are recorded on the tape.

Null Character

The Null character fills a vacant time slot, so vacated because new valid data was not received in time by the recording system to be entered on the tape. Null characters are recorded in the time slots in place of the data and the unit CPU is again requested for new data. If trouble is encountered a second time, null characters are again recorded. This continues until valid data is received by the recording system or until the total size of the block exceeds some fixed upper limit. When a data block exceeds this limit the block is terminated. Unless the nature of the trouble condition prevents it the system attempts to record the data in the following block, in which case the block repeat character is set to a 1.

Data Block Entry Identifiers

The first three characters of each data block entry identifies the entry type, i.e., Header Label, Trailer Label, Billing Data, Metering Data, etc. Each block entry identification code consists of a unique combination of the special entry characters indicated in Table I.

TABLE I

| ATT CHARACTER | CPU CODE BIT POS 8421 | TAPE CODE GRAPHIC SYMBOL | TAPE CODE BIT POSITION 01234567P |
|---|---|---|---|
| +DIGITS | | | |
| 0 | 0000 | 0 | 111100001 |
| 1 | 0001 | 1 | 111100010 |
| 2 | 0010 | 2 | 111100100 |
| 3 | 0011 | 3 | 111100111 |
| 4 | 0100 | 4 | 111101000 |
| 5 | 0101 | 5 | 111101011 |
| 6 | 0110 | 6 | 111101101 |
| 7 | 0111 | 7 | 111101110 |
| 8 | 1000 | 8 | 111110000 |
| 9 | 1001 | 9 | 111110011 |
| 0 | 1010 | | 111110101 |
| *SPECIAL CHARACTERS | | | |
| BLANK | 1011 | | 111110110 |
| ENTRY CHAR a | 1100 | | 111111001 |
| ENTRY CHAR b | 1101 | | 111111010 |
| UNASSIGNED | 1110 | | 111111100 |
| UNASSIGNED | 1111 | | 111111111 |
| TAPE MARK | | | 000100110 |
| NULL | | | 000000001 |

*GENERATED BY THE TAPE TRANSPORT CONTROLLER, i.e., NOT BY THE UNIT CPU
+DIALED DIGIT '0'

| ENTRY IDENTIFIER | ENTRY DESCRIPTION |
|---|---|
| a, a, a | Header Label |
| a, a, b | Date & Time Label |
| a, b, a | Time Change Data Block |
| a, b, b | Trailer Label |
| b, a, a | Test Message Data Block |
| b, a, b | Billing Data Block |

-Continued

| ENTRY IDENTIFIER | ENTRY DESCRIPTION |
|---|---|
| b, b, a | Traffic Metering Data Block |
| b, b, b | Not Assigned |

Redundancy Checks

Compatibility requirements for nine track NRZI recording require the implementation of vertical, longitudinal and cycle redundancy check to insure tape validity.

Vertical Redundancy Check — VRC

The vertical redundancy or parity check VRC provides a means of checking for the proper number of 1-bits in each tape character (byte). The P track on the tape contains the parity bit for those bytes that otherwise would not conform to the parity mode (Odd Parity).

During a write operation the ticketing tape transport checks the column of bits for proper parity and inserts the appropriate parity bit at the time of writing the byte on the tape. The ticketing tape transport also reads back the tape for vertical parity check. If a parity error is detected an indication is given to the unit CPU of the error condition. The unit CPU normally outputs the same block of data for re-recording appropriately marked by the repeat block character.

Longitudinal Redundancy Check — LRC

The longitudinal redundancy check LRC monitors all tracks to insure the presence of an even number of 1-bits in each track of every block. As the tape is written, an odd or even indication of 1-bits in each track is automatically determined for the data block. A check bit is written at the end of each track such that the total number of bits in each track, including the check bit, is now even. The vertical combination of these longitudinal check bits make up the longitudinal check character.

The ticketing tape transport also reads the tape for longitudinal redundancy verification. If after reading all the data in a block, including the LRC character, an odd number of bits in any track is indicated, an LRC error indication is given to the unit CPU. As in the case of a detected parity error the data block is normally rewritten.

Cycle Redundancy Check — CRC

The CRC character is written at the end of each data block but prior to the LRC character.

The ATT recording subsystem does not generate the true CRC character but writes a dummy character in its place for format compatibility. The data processing center must be organized to handle the dummy CRC character in the initial preprocessing pass.

Gaps

Initial Gap

The gap following the trailing edge of the beginning of tape marker BOT to the leading byte of the first block of data is called the load point gap. This is a minimum of 3.75 inches.

Inter Block Gap — IBG

The size of the inter block gap IBG is 0.50 inches minimum, 0.60 inches nominal, 0.75 inches maximum. It is measured from the LRC character of the preceeding block to the first data byte of the next block.

Tape Mark Gap

The tape mark gap refers to the gap between the last data block and Tape Mark character. It is measured from the LRC character of the last data block, which is the Trailer or Transfer label, to the tape mark character. The tape mark gap is to be 3.75 inches minimum.

Detailed Description of ATT Tape Format

Each day's recording normally begins with a header label, followed by record blocks and ending with a trailer label. The last entry on the tape is the tape mark which indicates to the accounting center that no more information is stored on the tape. An ATT file is all the data blocks enclosed within and inclusive of the header and trailer label. The file may contain data for a whole day, fraction of a day, or multiple of days. Under certain conditions the Transfer label is used in place of the Header and/or Trailer label. The data blocks are primarily billing data blocks, including fifteen call records to a block, but they could also be time change data blocks, traffic metering data blocks, or other type data as the need arises.

Within any given block the data must be of the same type, i.e., all call record data, all metering data, etc. Also all blocks of a given type are of a fixed information length. The information length of a block is determined by counting all type bytes in a block except null characters. A description of the basic tape organization is given in the application Ser. No. 434,742 of B. F. Gearing et al.

Basic Data Block Structure

As shown in the application Ser. No. 434,742 of B. F. Gearing et al., the first 8 bytes of all blocks consist of a 3-byte identification code, a 4-byte block size field, and 1-byte repeat block character.

The identification code is the appropriate entry identifier as defined above. The block size field indicates the number of bytes in the block, excluding null characters.

The repeat block character can be either a 0 or 1. A zero indicates that the block is an initial recording of the data. If the error checking circuitry detects an error while recording a block the entire block is re-written with the repeat block character set to a one in the repeated block.

Labels

The header, trailer and data/time label format is shown in Table II.

TABLE II

| ENTRY | NO. OF BYTES |
|---|---|
| BLOCK ENTRY IDENTIFICATION CODE | 3 |
| BLOCK SIZE | 4 |
| REPEAT BLOCK CHARACTER | 1 |
| OFFICE TYPE | 1 |
| TAPE TRANSPORT I.D. | 1 |
| BLANK CHARACTER | 2 |
| OFFICE IDENTIFICATION | 6 |
| DAY | 2 |
| MONTH | 2 |
| YEAR | 2 |
| HOUR | 2 |
| MINUTES | 2 |
| FILE COUNT | 1 |
| BLANK CHARACTER | 1 |
| CALL RECORD COUNT | 6 |
| BLOCK COUNT | 4 |
| BLANK CHARACTER | 2 |
| REPEAT BLOCK COUNT | 4 |
| BLANK CHARACTER | 2 |
| | 48 |

Header Label

The header label is the first block of ATT information recorded on a tape. It marks the start of a new file consists of 48 tape bytes and included within it is the ffice type code and office identification code.

| | |
|---|---|
| ffice Type Code (No. 1 EAX LAMA) | 0 (Zero) |
| ffice Identification Code | 6 Bytes |

The header label is recorded a minimum of 3.75 nches following the trailing edge of the beginning of ape BOT marker.

Trailer Label

The trailer label is the last information block entered n the tape. It marks the end of a file. It consists of the ame information content as the header label except or the Label Identifier characters.

A tape mark is recorded a minimum 3.75 inches folowing the last byte in the trailer label. The combinaion of the trailer label, tape mark gap and tape mark ndicate to the accounting center that no more infornation is recorded on the tape. Under certain fault onditions a trailer label may not be recorded; but vhen the trailer label with tape mark is recorded, no lata will be written past it. If more than one day's reords are recorded on the same tape reel the tape mark s recorded following the trailer label of the last day nly.

Date and Time Label

The data and time label is recorded immediately folowing midnight of each day to mark the transition rom one calendar day to the next. In the case of a tape unit failure, tape breakage, end of tape condition, TTY nstruction or some other emergency which requires ransferring to another ATT recording, a transfer label, ather than a header label is recorded at the start of the new tape reel. Its primary purpose is to provide a positive reference on tape at the start of each calendar day for those files which span multiple days. Except when the nature of the fault condition prevents it, the transfer label is also entered at the end of the original tape, in lieu of the trailer label.

Except for the label identifier character, the date and time label has the same information content and format as does the header and trailer labels.

Record Blocks (Other Than Call Records)

Table III shows the time change data block format.

TABLE III

| ENTRY | | NO. OF BYTES |
|---|---|---|
| BLOCK ENTRY IDENTIFICATION CODE | | 3 |
| BLOCK SIZE | | 4 |
| REPEAT BLOCK CHARACTER | | 1 |
| BLANK CHARACTER | | 4 |
| DAY | BEFORE CHANGE | 2 |
| MONTH | | 2 |
| YEAR | | 2 |
| HOURS | | 2 |
| MINUTES | | 2 |
| SECONDS | | 2 |
| DAY | AFTER CHANGE | 2 |
| MONTH | | 2 |
| YEAR | | |
| HOURS | | 2 |
| MINUTES | | 2 |
| SECONDS | | 2 |
| BLANK CHARACTERS | | 12 |
| | | 48 |

The Time Change record block is inserted in any tape which is in process during a change between daylight savings and standard time, or when time must be corrected due to clock failure, power failure, etc.

Traffic Data Block

Traffic metering data may be recorded on the tape interspersed with the ATT data blocks. Referring to Table I, a traffic data block identifier, or ATT character, precedes each block. The content and data format of the traffic data block is determined at a later date.

Test Message Record

To routine the system, a test message is generated in the unit CPU and transmitted to the tape deck while in a standby mode for the purpose of checking the recording system for correct operation. The test message consists of a fixed pattern of self-checking characters in which the bits are arranged in a repetitive sequence.

The test message is a fixed length message of which the first three characters comprise the test message entry identifier code described above.

A test message is normally recorded following the threading of a new reel of tape into the transport while it is in the standby mode. As such the test message is normally the first data block on a tape following the beginning of tape marker BOT. A test message recorded prior to the header label is intended for internal control purposes within the system machine and is ignored by the data processing center. The data processing center only processes data recorded between the header and trailer labels which indicate the beginning and ending of a data file.

Billing Data

A billing data block consists of 15 individual call records. A call record is herein defined as a group of data pertaining to an individual call. Call records are made for individual subscriber billing, division of revenue and traffic studies. The billing data block format is given in Table IV.

TABLE IV

| | | | |
|---|---|---|---|
| | BLOCK ENTRY IDENTIFICATION CODE | 3 | |
| | BLOCK SIZE | 4 | |
| | REPEAT BLOCK CHARACTER | 1 | |
| | BLANK CHARACTERS | 4 | |
| 1st Call Record | CALL RECORD ENTRY CHARACTER | 1 | 48 bytes |
| | TYPE OF CALL (CLASS OF CHARGE) | 2 | |
| | SERVICE FEATURE CODE | 2 | |
| | INFORMATION DIGITS | 3 | |
| | CALLING NO. | 10 | |
| | ANSWER TIME | 6 | |
| | CALLED NO. | 10 | |
| | DISCONNECT TIME | 6 | |
| | MIDNIGHTS PASSED DIGIT | 1 | |
| | SCAN POINT NO. (EQUIPMENT NO.) | 6 | |
| | MODIFIER DIGIT | 1 | |
| | ⋮ | | |
| 15th Call Record | CALL RECORD | 1 | 48 bytes |
| | TYPE OF CALL | 2 | |
| | SERVICE FEATURE CODE | 2 | |
| | INFORMATION DIGITS | 3 | |
| | CALLING NO. | 10 | |
| | ANSWER TIME | 6 | |
| | CALLED NO. | 10 | |
| | DISCONNECT TIME | 6 | |
| | MIDNIGHTS PASSED DIGIT | 1 | |
| | SCAN POINT NO. | 6 | |
| | MODIFIER DIGIT | 1 | |
| | BLANK CHARACTERS | 12 | |
| | | 744 | |

The first three fields of a billing data block are:

| Information | No. of Bytes |
|---|---|
| Block Entry Identification Code | 3 |
| Block Size | 4 |
| Repeat Block Character | 1 |

General Entry Format for a Call Record

Each call record is preceded by a single character entry identifier which is general to all call record entries.

| | ENTRY | NO. OF BYTES |
|---|---|---|
| | Entry Character (a) | 1 |
| Data Group A | Type of Call (Class of Charge) Code | 2 |
| | Type of Service Code | 2 |
| | Information Code | 3 |
| | Calling No. | 10 |
| | Answer Time | 6 |
| Data Group B | Called No. | 10 |
| | Disconnect Time | 6 |
| | Midnight Passed Digit | 1 |
| | Equipment No. | 6 |
| | Modifier Digit | 1 |

All Data Group B information is recorded as "blank" characters for MRS type call records.

Data Group A
Type of Call (Class of Charge)
The Type of Call or Class or Charge Codes are

| Code | Description |
|---|---|
| 00 | Message Rate |
| 01 | Station Paid |
| 02 | DTWX - Station Paid |
| 03 | WATS - Measured |
| 04 | WATS - Flat Rate |
| 05 | INWATS |
| 06 | SSN |
| 07, 08, 09 | Unassigned |

Type of Service Code

| Code | Description |
|---|---|
| 00 | Other |
| 01 | Coin |
| 02 | Series Completing |
| 03 | Three Way Calling |
| 04 | Call Transfer |

The purpose of the type of service code is to provide additional information regarding any special subscriber service feature involved in completing the call.

Information Digits

These are primarily sorting digits. They provide information in regard to the intended disposition of the call record, i.e., was it prepared for billing or for study purposes or for both; and a time change made in the system clock which would effect the computed billing charges.

| 1st Digit | |
|---|---|
| 0 (0000) | Traffic Sampled, No Charge |
| 1 (0001) | Charge |
| 2 (0010) | Traffic Obs. No Charge |
| 3 (0011) | Traffic Obs. Charge |
| 4 (0100) | Time Change |
| 5 (0101) | Time Change, Charge |
| 6 (0110) | Time Change, Traffic Obs, No Charge |
| 7 (0111) | Time Change, Traffic Obs, Charge |
| 8 (1000) | Incomplete |
| 9 (1001) | Currently Unassigned |

Second Digit

Currently unassigned, always zero for the ticketing system LAMA.

Third Digit

Currently unassigned, always zero for the ticketing system LAMA.

Calling Number 10 BCD Digits Total. Three digit NPA Code, three digit Office Code, and four digit terminal number.

Answer Time six BCD Digits Total: two digits for hours, two digits for minutes and two digits for seconds.

Data Group B

| | |
|---|---|
| Called No: | Ten BCD digits total: Three digit NPA, three digits office code and four digit terminal number. |
| Disconnect Time: | Six BCD digits total: Two digits for hours, two digits for minutes and two digits for seconds. |
| Midnights Passed: | One BCD digit - indicates if the recorded answer time refers to the same day as the disconnect time or to some prior day. |
| Trunk Identification No: | Six BCD digits total. The identification number recorded is the scan point address of the associated trunk or originating junctor OJ. |
| Modifier Digit: | Currently not applicable to the ticketing system LAMA operation, i.e., always zero. |

Call Record Entries for Office Administrative Functions

Two types of records are prepared for administrative purposes. These are traffic sampled entries and traffic observed entries. For traffic sampling purposes: Toll ticketing continuously records a certain percentage of calls of a specific type. The recordings are usually prepared for division of revenue and tax purposes. For traffic observation the system under the direction and control of TTY instructions prepares call records of toll traffic which is not normally recorded for billing purposes.

Traffic Sampling Entries

INWATS

A type 05 call record entry is prepared for all completed outgoing INWATS calls. The special NPA code "800" followed by a specific NNX office code for each NPA identifies an INWATS call. The NN2 office codes indicate intrastate service and all others indicate interstate usage. The first information digit marks the call as being traffic sampled and non-chargeable (0000).

WATS

A type 04 call record is prepared for 10 percent of all completed outgoing flat rate WATS calls. A special office code identifies the WATS call. The initial digit of the C.O. code indicates whether the service is flat rate or measured; the middle digit indicates the accounting center; and the third denotes the calling zone. The first information digit would mark the flat rate WATS entry as traffic sampled and non-chargeable (0000). Measured rate WATS calls are chargeable and ticketed as normal DDD type calls.

Switched Service Network SSN

A type 06 call record entry is prepared for 20 percent of all completed SSN calls switched via the ticketing office. A special office code number identifies the SSN call. The first information digit denotes the call as traffic sampled and non-chargeable (0000).

Traffic Observation Entries

Trunk Group Calls

Under an input instruction from the office administration TTY the system can be directed to prepare a call record for all calls, completed and uncompleted, terminated via any outgoing toll trunk group, even though the call may not normally be ticketed for billing purposes. All calls so recorded are marked as traffic observed by the first information digit. Those which are normal billable calls are denoted as chargeable and those not billable denoted as non-chargeable. A subsequent instruction from the TTY inhibits the recording of trunk group calls. For example:

Incomplete Calls

The first information digit code marks the entry as an incomplete call. The recording time is recorded in place of the disconnect time. The answer field is filled with blank characters.

Toll Information Operator Calls

Since answer supervision is not received on calls to an operator position the call is recorded similar to an incomplete call. The called number identifies the call. The recording time is recorded in place of disconnect time and the answer time field filled with blank characters. If answer supervision is returned this is an indication of fraud. In this case both answer and disconnect time is recorded and the first information digit indicates the call to be chargeable.

Toll Free Calls

When a trunk group is marked for traffic observation a study ticket is prepared on all toll free calls as well as billable calls. The ticketed data is the same as for any billable DDD call except that the first information digit marks the call as traffic observed and non-chargeable.

Transport and Tape Requirements

The primary requirement of the magnetic tape transport and its read write electronic circuitry, from the standpoint of the ATT tape format, is that it must be capable of preparing a tape which can be read by an IBM Series 2400 Magnetic Tape Unit. It must also be capable of reading a tape which has been prepared on one of the above units.

The tape is intended to be a heavy-duty type one-half inch wide magnetic tape designed for computer use. The ferromagnetic coating should be about 0.5 mil and the mylar base about 1.5 mils thick. Standard tape reels are 10½ inch diameter accommodating 2,400 feet of tape and 8½ inch diameter handling 1,200 feet. The tape has a reflector marker BOT Beginning of Tape or marker LP Load Point, located about ten feet from the outer end of the tape indicating the useful beginning of the tape reel. Similarly, a reflective marker EOT, End of Tape, is located about 14 feet from the inner end of the tape to indicate the end of the useful tape area.

At a recording density of 800 bpi, the tape length requirements is 9 feet/1,000 calls and transport "time in use" requirements as a percent of total BH time is 1 percent/1,000 BH calls.

Transport Change-Over Modes and the Recording of Header and Trailer Labels

The ATT subsystem is equipped with two magnetic tape transports which alternately function on the active and standby mode. There are basically two types of change-over control modes which control transfer of an active unit to standby and vice versa. These modes are the normally scheduled change-over and the fault change-over.

Normally Scheduled Change-Over

The normally scheduled tape transport change-over is initiated by a special TTY request. As it is operator initiated, the time of change-over and interval between change-overs is office dependent. When the change-over request is made the standby unit is automatically routined. If the routine passes it is transferred to the Active-On Line state. A header label is written to open the file on the new active unit and a trailer label is written to close the file on the old active unit. When the operator receives confirmation of the change-over the old active unit is taken off-line, and the tape reel is removed and rewound.

A single tape reel holds the data for more than 200,000 ticketed and metered calls. The data transfer rate is also sufficient to handle the traffic density with a single transport. Normally the tape reels are changed each business day. Hence, there is little reason, other than machine failure, to expect the billing data for a single business day to be recorded on more than one tape reel. Under normal conditions, one business day's data is recorded per tape file and one tape file is recorded per tape reel.

Fault Change-Over

When a machine fault occurs the change-over takes place automatically, i.e., without the presence and initiation of an operator. A header label is automatically written on the "transferred to" reel but no trailer label is written on the "transferred from" reel. The trailer label is not automatically written, because it cannot be assured that the tape reel will be removed following the change-over. Under certain fault conditions the same transport might be transferred back to before the reel is removed. When the operator is ready to remove the tape a special TTY request to write the trailer label and tape mark is initiated before the unit is set off-line.

It is, therefore, possible for a tape reel to have multiple header labels but only one trailer label. It is also possible to have no trailer label if the nature of the fault prevents writing the tape.

File, Call Record and Block Counts

File Count Index

The File Count index is always a 1 for the header label written as a result of a normal change-over TTY request. The file count index is incremented for each successive fault change-over executed in the interval between normal change-overs. The file count index in the trailer or date/time labels is the same as that written in the previous header label.

Call Record Count Index

The call record count index is reset to "zero" at the start of each new tape file, that is, each header label. The call record count index recorded in a trailer or date/time label is the accumulated count of call records written in the file since the previous header label.

Block Count Index

The block count index is reset to zero for the start of each new file, header label. The index recorded in a trailer or date/time label is the accumulated count of all data blocks, including labels and repeated blocks, written in the file since the previous header label.

Repeat Block Count Index

The repeat block count index is reset to zero for each new header label written. The index recorded in the trailer or date/time label is the accumulated count of all repeated blocks since the start of the file.

What is claimed is:

1. In a communication switching system having a switching network for establishing connections between calling and called lines under the control of common equipment including a stored program central processor and having recording apparatus for storing system information, a control arrangement for the recording apparatus comprising:

input means for receiving a series of information words from the central processor for storing them temporarily therein;

output means for transferring information to said recording apparatus;

logic means for transferring sequentially portions of said word to said output means for supplying to said recording apparatus;

fill producing means for generating fill information portions to be transferred along with portions of said word to said output means; and circuit means responsive to the central processor interrupting its supplying of information words to said input means for inhibiting said fill information to cause said output means to generate null information indicative of interruption.

2. A control arrangement according to claim 1, wherein said input means include a four word shift register.

3. A control arrangement according to claim 2, wherein said output means includes a non-return to zero change at one register.

4. A control arrangement according to claim 3, wherein said logic means includes a byte allotter.

5. A control arrangement according to claim 4, wherein said circuit means includes a logic gate which is inhibited in response to said interruption.

6. A control arrangement according to claim 5, wherein said recording apparatus includes magnetic tape equipment.

* * * * *